(12) United States Patent
Nakazato

(10) Patent No.: US 6,282,667 B1
(45) Date of Patent: *Aug. 28, 2001

(54) METHOD AND APPARATUS FOR SELECTIVELY POWERING CIRCUITRY WITHIN A SOUND DEVICE TO PERFORM SELECTED SOUND FUNCTIONS

(75) Inventor: Ryu Nakazato, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,414

(22) Filed: Oct. 17, 1997

(30) Foreign Application Priority Data

Oct. 22, 1996 (JP) .................................................. 8-279437

(51) Int. Cl.[7] ........................................................ G06F 1/32
(52) U.S. Cl. ............................................ 713/324; 713/323
(58) Field of Search .................................. 713/300, 320, 713/321, 323, 324, 310

(56) References Cited

U.S. PATENT DOCUMENTS

| | | | |
|---|---|---|---|
| 5,009,147 | * 4/1991 | Yamamori ............................... 84/618 |
| 5,167,024 | * 11/1992 | Smith et al. . | |
| 5,276,890 | * 1/1994 | Arai ....................................... 713/323 |
| 5,392,437 | * 2/1995 | Matter et al. ......................... 713/324 |
| 5,408,668 | * 4/1995 | Tornai .................................... 713/324 |
| 5,423,045 | 6/1995 | Kannan et al. ....................... 713/322 |
| 5,452,401 | * 9/1995 | Lin ........................................ 713/322 |
| 5,511,205 | 4/1996 | Kannan et al. ....................... 713/324 |
| 5,537,650 | * 7/1996 | West et al. ............................ 713/324 |
| 5,560,024 | * 9/1996 | Harper et al. ........................ 713/322 |
| 5,617,571 | * 4/1997 | Tanaka ................................... 713/324 |
| 5,625,826 | * 4/1997 | Atkinson .............................. 713/322 |
| 5,675,814 | * 10/1997 | Pearce ................................... 713/324 |
| 5,822,598 | * 10/1998 | Lam ....................................... 713/324 |
| 5,841,431 | * 11/1998 | Simmers .............................. 345/211 |
| 5,881,300 | 3/1999 | Ryu ................................. 395/750.08 |
| 5,881,317 | * 3/1999 | Hampsten et al. ..................... 710/62 |
| 6,044,408 | * 3/2000 | Engstsrom et al. .................. 709/302 |

* cited by examiner

Primary Examiner—Sumati Lefkowitz
(74) Attorney, Agent, or Firm—Finnegan, Henderson, Farabow, Garrett & Dunner, L.L.P.

(57) ABSTRACT

A sound controller comprises circuitry that performs a variety of sound functions. The circuitry is only powered when required by an application program. A power-saving driver receives a message issued from an operating system. When the message means indicates that a sound function is starting to be used, the power-saving driver turns on the power supply of a sound controller and then hands over the message to the sound device driver. In contrast, when the message indicates that the use of the sound function is ending, the power-saving driver first hands over the message to the sound driver, thereby causing the sound driver to execute an end process. After a predetermined time has elapsed since the power-saving driver handed over the message, it turns off the power supply of the sound controller.

4 Claims, 7 Drawing Sheets

METHOD AND APPARATUS FOR SELECTIVELY POWERING CIRCUITRY WITHIN A SOUND DEVICE TO PERFORM SELECTED SOUND FUNCTIONS

BACKGROUND OF THE INVENTION

The present invention relates to a computer system with a sound device providing a sound function and to a method of controlling the power supply of the sound device, and more particularly to a computer system capable of remarkably reducing the amount of electric power unnecessarily consumed by a sound device and to a method of controlling the power supply of the sound device.

In recent years, a variety of portable information devices that are easy to carry with and can operated from a battery have been developed. Most of the portable information devices of this type have a sound function for dealing with sound effects, music, speech, and the like.

The sound function is provided by a sound device (e.g., a sound controller) in the information device. The sound device is constituted by a dedicated logic circuitry composed of various circuits corresponding to the sound functions of a plurality of types, including WAVE sound and MIDI sound.

Recently, a new use of computers known as mobile computing has been finding its way in various fields. In mobile computing, the user loads only the necessary ones of the data items managed by a desk-top personal computer serving as, for example, a server into the user's easy-to-carry portable information device. Subsequently, the user does data processing work using the data in the portable information device at the user's destination or in the middle of moving to the destination. With the popularization of such mobile computing, the possible continuous running time of a computer operating from a secondary battery has begun to be considered important. In this connection, thorough power saving has been studied in the development of portable information devices.

The sound device, however, is constantly being powered as long as the power supply of the portable information device is in operation, regardless of whether the sound function is currently being used or not. This leads to a waste of electric power.

To sum up, the latest personal computers are provided with a sound device for providing a sound function. The sound device has the problem of wasting electric power, because electric power is constantly being supplied to the sound device as long as the power supply of the personal computer is in operation, regardless of whether the sound function is currently being used or not.

BRIEF SUMMARY OF THE INVENTION

Accordingly, it is an object of the present invention to provide a computer system capable of remarkably reducing the electric power unnecessarily consumed by a sound device and a method of controlling the power supply of the sound device.

According to one aspect of the present invention, there is provided a computer system comprising: a sound device including various circuits that provide various types of sound functions; means responsive to a request of an application program and capable of issuing an open message to start the execution of a specific type of sound function or a close message to end the execution of the sound function; and power-saving means including: means responsive to the open message issued from the issuing means, for controlling the sound device such that electric power is supplied to the circuits providing the specific type of sound function; and means for responsive to the close message issued from the issuing means, for controlling the sound device such that the supply of electric power to the circuits providing the specific type of sound function is stopped.

The system may further comprise sound device driving means for driving the sound device. In this case, the power-saving means may hand over the open message or close message issued from the issuing means to the sound device driving means. The sound device driving means may control the sound device such that the sound process of the corresponding type in the sound device is started or stopped in response to the open message or close message handed over by the power-saving means. Moreover, the power-saving means may control the sound device such that the supply of electric power to the circuits providing the specific type of sound function is stopped after a predetermined time has elapsed since the power-saving means handed over the close message to the sound device driving means. In this case, the power-saving means may include a timer for counting the predetermined time. Moreover, the sound device may include a common amplifier shared by the various circuits. In this case, the power-saving means may control the sound device such that electric power is supplied to the common amplifier, when at least one of the various types of sound functions is in operation. The power-saving means may include a plurality of counters that are provided so as to correspond to the various types of sound functions and indicate whether or not the corresponding types of sound functions are in operation. Moreover, at least one of the various circuits included in the sound device may be a WAVE exclusive circuit or a MIDI exclusive circuit.

According to another aspect of the present invention, there is provided a computer system comprising: a sound device including various circuits that provide various types of sound functions; an operating system responsive to a request of an application program and capable of issuing an open message to start the execution of a specific type of sound function or a close message to end the execution of the sound function; and a power-saving driver for controlling the sound device such that electric power is supplied to the circuits providing the specific type of sound function in response to the open message issued from the operating system, and controlling the sound device such that the supply of electric power to the circuits providing the specific type of sound function is stopped in response to the close message issued from the operating system.

The system may further comprise a sound device driver for driving the sound device.

According to still another aspect of the present invention, there is provided a power-supply control method for use in a computer system which has a sound device including various circuits that provide various types of sound functions and an operating system responsive to a request of an application program and capable of issuing an open message to start the execution of a specific type of sound function or a close message to end the execution of the sound function, the power-supply control method comprising the steps of: controlling the sound device such that electric power is supplied to the circuits providing the specific type of sound function, when the operating system has issued the open message; and controlling the sound device such that the supply of electric power to the circuits providing the specific type of sound function is stopped, when the operating system has issued the close message.

The power supply stopping control may be carried out after a predetermined time has elapsed since the sound process of the corresponding type in the sound device was stopped.

According to yet still another aspect of the present invention, there is provided a recording medium having program code instructions stored thereon which perform power-supply control in a computer system which has a sound device including various circuits that provide various types of sound functions and an operating system responsive to a request of an application program and capable of issuing an open message to start the execution of a specific type of sound function or a close message to end the execution of the sound function, the instructions comprising: controlling the sound device such that electric power is supplied to the circuits providing the specific type of sound function, when the operating system has issued the open message, and controlling the sound device such that the supply of electric power to the circuits providing the specific type of sound function is stopped, when the operating system has issued the close message.

The power supply stopping control may be carried out after a predetermined time has elapsed since the sound process of the corresponding type in the sound device was stopped.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Hereinafter, referring to the accompanying drawings, an embodiment of the present invention will be explained.

Figure 1:
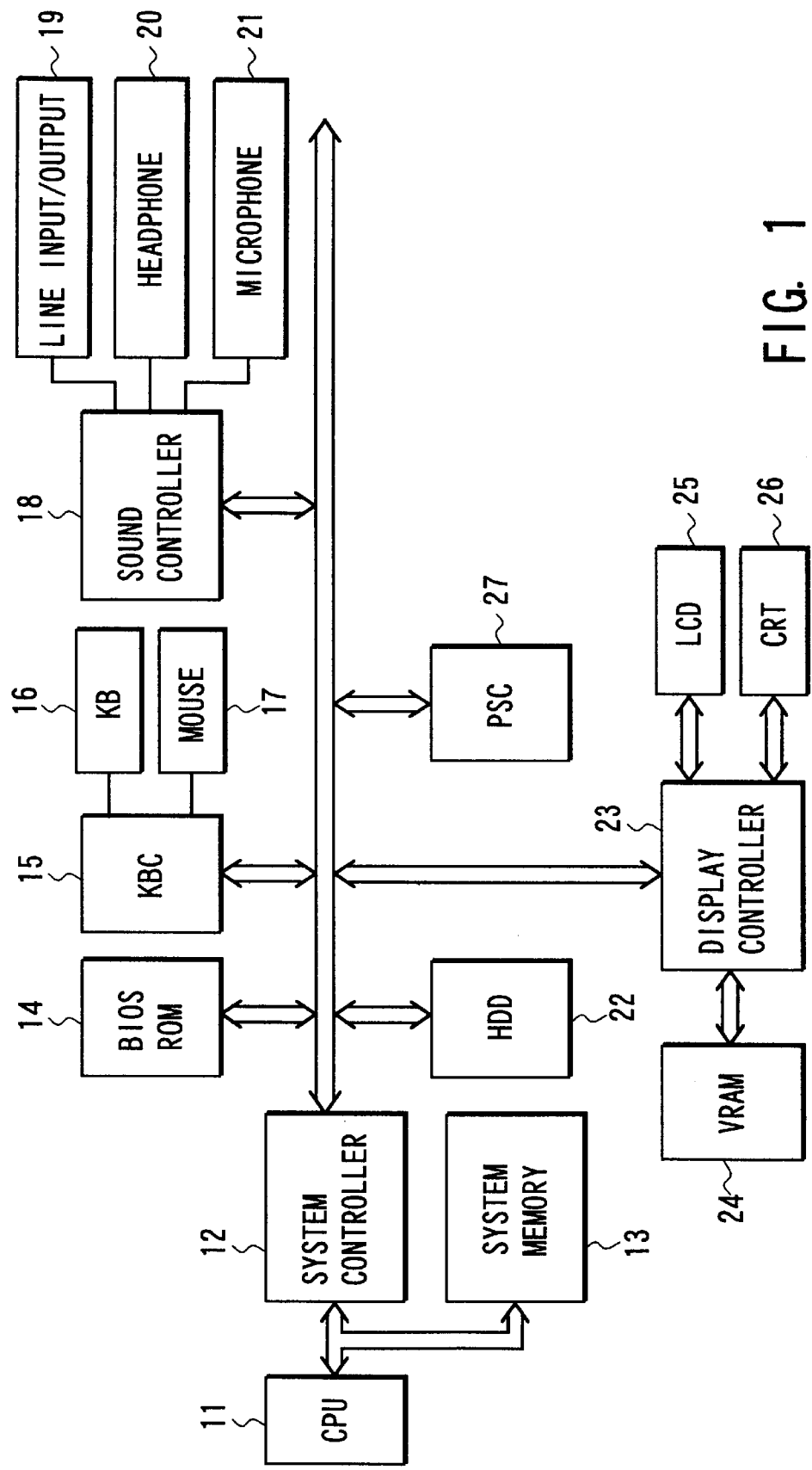
FIG. 1 is a block diagram of a personal computer according to an embodiment of the present invention.

FIG. 1 shows the configuration of a personal computer according to the embodiment.

As shown in FIG. 1, the personal computer of the embodiment comprises a CPU 11, a system controller 12, a system memory 13, a BIOS-ROM 14, a keyboard controller (KBC) 15, a sound controller (a sound device) 18, a magnetic disk device (HDD) 22, a display controller 23, a VRAM 24, an LCD 25, a CRT 26, and a power supply controller (PSC) 27.

The CPU 11 controls the execution of the operating system and application programs including utility programs stored in the system memory 13.

The system controller 12 controls the memories and the I/O devices in the system. The system memory 13 stores the operating system executed by the CPU 11, application programs including utility programs, and the user data created with application. programs.

The BIOS-ROM 14 stores a system BIOS and a VGA BIOS. It is composed of a flash memory that enables the rewriting of programs.

The keyboard controller 15 controls a keyboard (KB) 16, a mouse 17, and the like. It scans the key matrix of the keyboard 16, receives the signal corresponding to the pressed key, and converts the signal into a specific key code (a scan code). The keyboard controller 15 has the function of controlling the mouse 17 using a dedicated processor.

The sound controller (sound device) 18 includes various circuits that achieve the WAVE-type and MIDI-type sound functions. A line input/output terminal 19, a headphone terminal 20, and a microphone terminal 21 are connected to the sound controller 18.

The magnetic disk device (HDD) 22 is a secondary storage device with a large capacity that transmits and receives data to and from the system memory 13.

The display controller 23 controls the LCD 25 and the CRT 26. It receives the display data from the CPU 11 and writes it into the VRAM 24.

The power supply controller (PSC) 27 has the function of controlling the power supply of the entire system using a dedicated processor.

Figure 2:
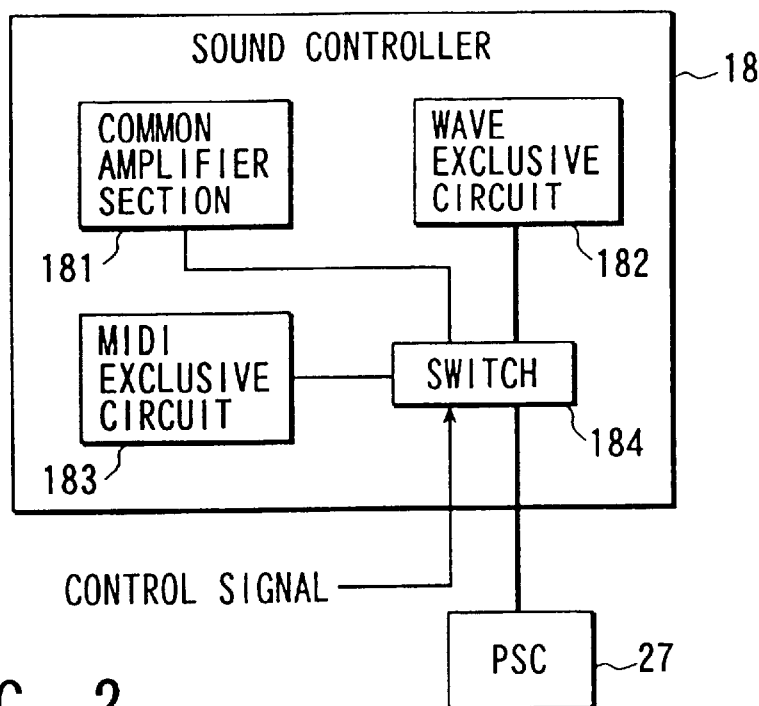
FIG. 2 is a schematic block diagram of the sound controller in the personal computer of FIG. 1.

FIG. 2 is a schematic block diagram of the sound controller 18.

As shown in FIG. 2, the sound controller 18 includes a WAVE exclusive circuit 182, a MIDI exclusive circuit 183, a common amplifier section 181, and a switch 184.

The WAVE exclusive circuit 182 provides a WAVE-type sound function, whereas the MIDI exclusive circuit 183 provides a MIDI-type sound function. The common amplifier section 181 is shared by the WAVE exclusive circuit 182 and MIDI exclusive circuit 183. When power is being supplied to at least one of the WAVE exclusive circuit 182 and MIDI exclusive circuit 183 and the circuit to which the power is being supplied is now in operation, the common amplifier section 181 has to be supplied with electric power, too.

According to the control signal from a power-saving driver 34 (explained later), the switch 184 switches the power supplying route through which electric power is supplied from the power supply controller (PSC) 27 to each of the common amplifier section 181, WAVE exclusive circuit 182, and MIDI exclusive circuit 183.

The switch 184 operates as follows: (i) when only the WAVE-type sound function is in operation, the switch 184 secures the power supplying route so that the power may be supplied to the common amplifier section 181 and WAVE exclusive circuit 182; (ii) when only the MIDI-type sound function is in operation, it secures the power supplying route so that the power may be supplied to the common amplifier section 181 and MIDI exclusive circuit 183; and (iii) when both of the WAVE-type sound function and MIDI-type sound function are in operation, it secures the power supplying route so that the power may be supplied to the common amplifier section 181, WAVE exclusive circuit 182, and MIDI exclusive circuit 183.

Figure 3:
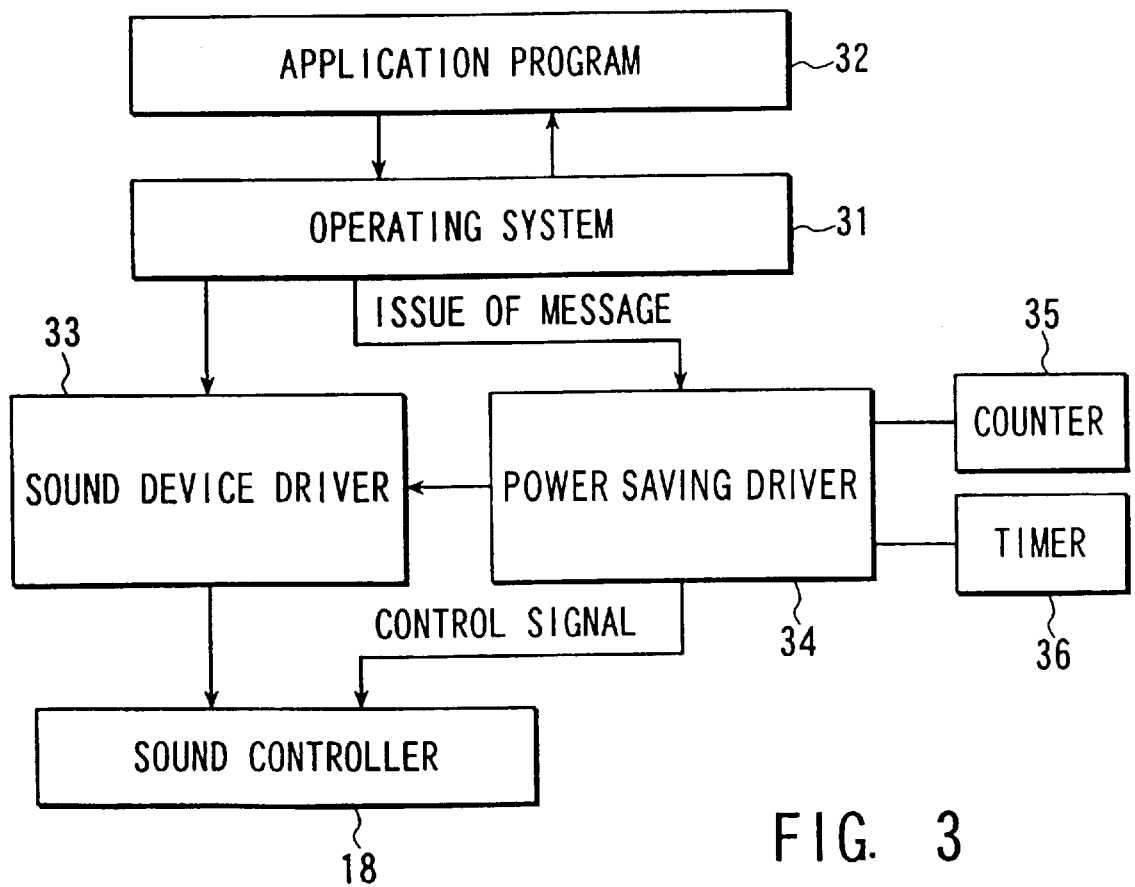
FIG. 3 is a functional block diagram of the various functions for controlling the execution of the sound function in the personal computer of FIG. 1.

FIG. 3 is a functional block diagram of the various functions for controlling the execution of the sound functions in the personal computer of the embodiment.

The operating system 31 supervises the entire system. Under the control of the operating system 31, various application programs (including an application program 32), a sound device driver 33, a power-saving driver 34, and the like are in operation.

According to the user's instruction, the application program 32 requests the operating system to start and end the execution of the sound functions of the various types (including the WAVE type and the MIDI type).

When being requested by the application program 32 to start the execution of, for example, the WAVE-type sound function, the operating system 31 issues a message (an open message) to start the execution of the WAVE-type sound function.

To end the execution of the WAVE-type sound function, the operating system 31 issues a message (a close message) to end the execution of the WAVE-type sound function.

While the way the operating system 31 deals with the WAVE-type sound function has been explained, the same is true when the operating system 31 deals with the MIDI-type sound function.

With the present invention, the open message and close message issued from the operating system 31 are sent to the power-saving driver 34, not to the sound device driver 33.

The sound device driver 33 drives the sound controller 18.

When receiving, for example, an open message to start the execution of the WAVE-type sound function from the power-saving driver 34, the sound device driver 33 drives and controls the sound controller 18 to cause the WAVE-type sound data sent via an expansion bus to be subjected to a sound process..

When receiving a close message to end the execution of the WAVE-type sound function from the power-saving driver 34, the sound device driver 33 controls the sound controller 18 to stop the processing of the WAVE-type sound data.

While the way the sound device driver 33 deals with the WAVE-type sound function has been explained, the same is true when the sound device driver 33 deals with the MIDI-type sound function.

The power-saving driver 34 is provided to save the electric power consumed by the sound controller 18. The power-saving driver 34 requests the operating system 31 beforehand to inform the driver 34 of the issued message. This makes it possible for the power-saving driver 34 to receive (hook) the message each time the operating system 31 issues an open message or a close message.

When receiving, for example, an open message to start the execution of the WAVE-type sound function, the power-saving driver 34 sends to the sound controller 184 a control signal indicating that electric power should be supplied to the WAVE exclusive circuit 182.

When the sound functions except for the WAVE-type one are out of operation (in the embodiment, when the MIDI-type sound function is out of operation), no electric power is being supplied to the common amplifier 181. Particularly in this case, the power-saving driver 34 sends to the switch 184 of the sound controller 18 not only a control signal indicating that electric power should be supplied to the WAVE exclusive circuit 182 but also a control signal indicating that electric power should be supplied to the common amplifier section 181. According to the control signal, the switch 184 in the sound controller 18 switches the power supplying route so that the electric power from the PSC 27 may be supplied to the WAVE exclusive circuit 182 and the common amplifier circuit section 181.

After sending the control signal to the sound controller 18, the power-saving driver 34 hands over the open message from the operating system 31 to the sound device driver 33. As a result, the sound device driver 33 operates as if it received the open message from the operating system 31 and begins to drive the sound controller 18 including the common amplifier section 181 and WAVE exclusive circuit 182 that are being supplied with the power.

When receiving a close message to end the execution of the WAVE-type sound function, the power-saving driver 34 hands over the close message to the sound device driver 33. As a result, the sound device driver 33 operates as if it received the close message from the operating system 31 and begins to perform an end process to finish controlling the sound controller 18.

After a predetermined time (a time longer than the time required for the end process) has elapsed since the power-saving driver 34 handed over the close message to the sound device driver 33, the power-saving driver 34 sends to the sound controller 18 a control signal indicting that the power supply to the WAVE exclusive circuit 182 should be stopped. A timer 36 in the system is used to count the predetermined time.

When the sound functions except for the WAVE-type one are out of operation (in the embodiment, when the MIDI-type sound function is out of operation), electric power need not be supplied to the common amplifier section 181. Particularly in this case, the power-saving driver 34 sends to the sound controller 18 not only a control signal indicating that the power supply to the WAVE exclusive circuit 182 should be stopped but also a control signal indicating that the power supply to the common amplifier section 181 should be stopped. According to the control signal, the switch 184 in the sound controller 18 switches the power supplying route so that the supply of power from the PSC to the WAVE exclusive circuit 182 and common amplifier section 181 may be stopped.

While the way the power-saving driver 34 deals with the WAVE-type sound function has been explained, the same is true when the power-saving driver 34 deals with the MIDI-type sound function.

Figure 4:
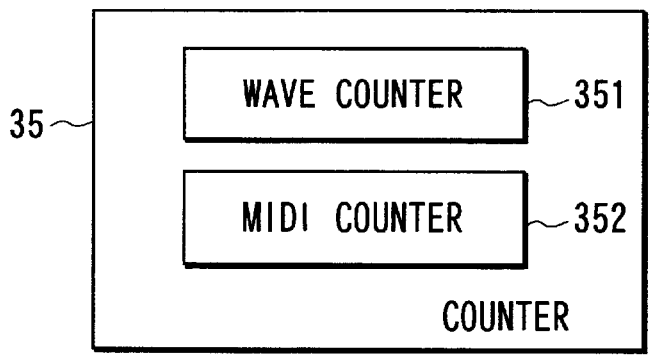
FIG. 4 shows the structure of the counter used by the power-saving driver of FIG. 1.

The power-saving driver 34 has a counter 35 in a specific storage area in the system. The counter 35 is used to check to see if each of the WAVE-type sound function (the WAVE exclusive circuit 182) and MIDI-type sound function (the MIDI exclusive circuit 183) is in operation. As shown in FIG. 4, the counter 35 includes a WAVE counter 351 and a MIDI counter 352.

For example, when the power-saving driver 34 has received an open message to start the execution of the WAVE-type sound function, it increments the WAVE counter 351. In contrast, when the power-saving driver 34 has received a close message to end the execution of the WAVE-type sound function, it decrements the WAVE counter 351.

Similarly, when the power-saving driver 34 has received an open message to start the execution of the MIDI-type sound function, it increments the MIDI counter 352. In contrast, when the power-saving driver 34 has received a close message to end the execution of the MIDI-type sound function, it decrements the MIDI counter 352. As a result, when the value of either counter is zero, the power-saving driver can recognize that the corresponding sound function is now out of use.

Figure 5:
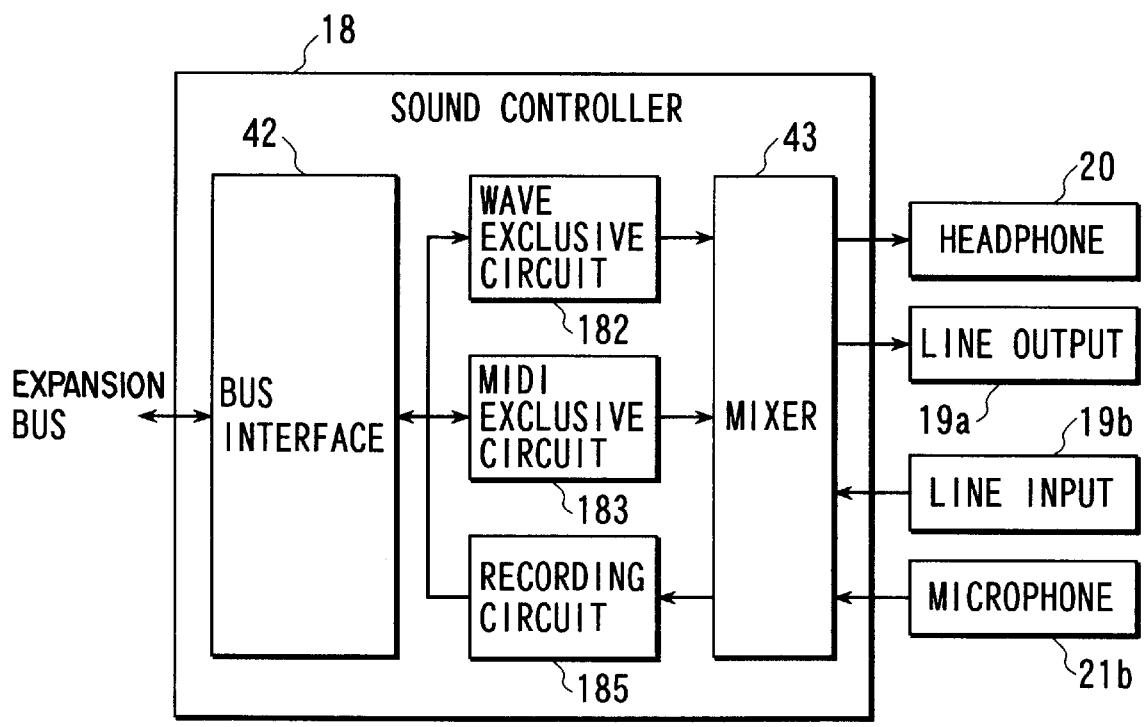
FIG. 5 is a functional block diagram to help explain the flow of data in the sound controller of the personal computer of FIG. 1.

FIG. 5 is a functional block diagram to help explain the flow of data in the sound controller of the embodiment.

The data (e.g., sound data) is sent to the sound controller 18 via an expansion bus (e.g., a PCI (Peripheral Component Interconnect) bus or an ISA (Industrial Standard Architecture) bus) in the personal computer.

A bus interface 42 enables data exchange between the external circuitry and the inside of the sound controller. The bus interface 42 sends the data transferred from the external circuitry to the corresponding circuit, depending on the type of sound (in the embodiment, the WAVE exclusive circuit 182 or the MIDI exclusive circuit 183). When receiving the data from a recording circuit 185, the bus interface 42 sends it to the expansion bus.

To provide the WAVE-type sound function, the WAVE exclusive circuit 182 converts the WAVE-type data sent from the bus interface 42 into a waveform of sound on the basis of an internal table. Similarly, to provide the MIDI-type sound function, the MIDI exclusive circuit 183 converts the MIDI-type data sent from the bus interface 42 into a waveform of sound on the basis of an internal table.

A mixer 43 corresponds to the common amplifier section 181 of FIG. 2. The mixer synthesizes sound of various types and outputs the synthesized sound to the outside via a headphone terminal 20 or a line output terminal 19a. When sound is supplied from the outside via a line input terminal 19b or a microphone terminal 21b, the mixer 43 causes a recording circuit 185 to take in the sound.

The recording circuit 185 has the function of taking in the sound from the outside via the mixer 43, converting it into WAVE-type data or MIDI-type data, and sending the converted data to the bus interface 42.

Figure 6:
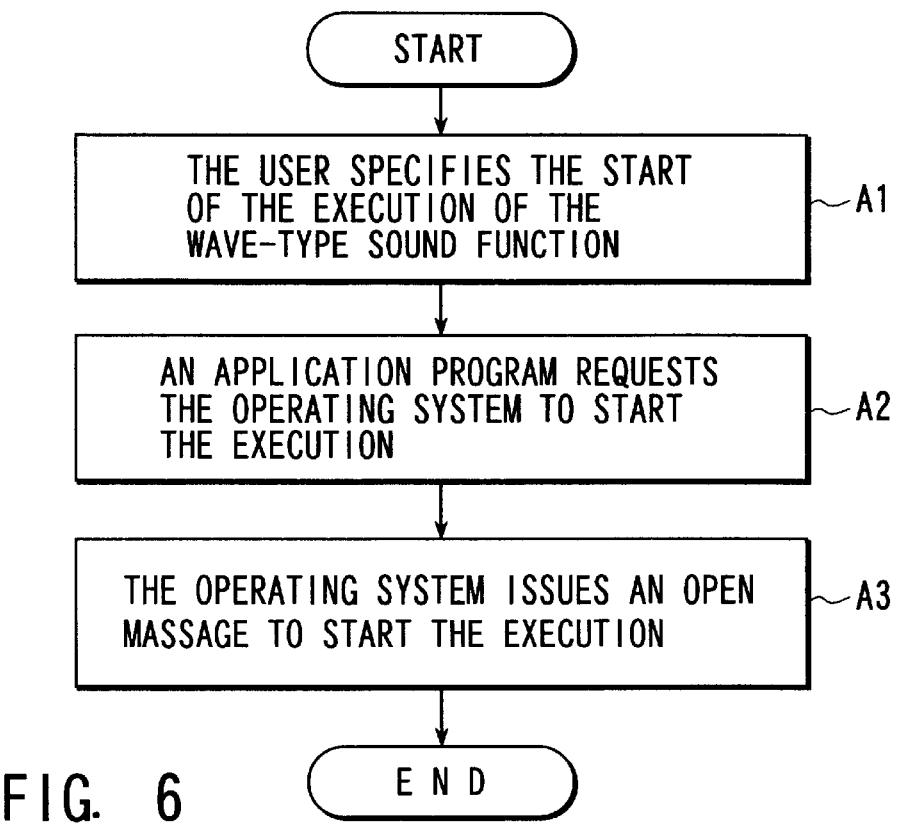
FIG. 6 is a flowchart of the procedure for issuing an open message according to an instruction to start the execution of the sound function.

Next, the procedure for issuing an open message according to an instruction to start the execution of the sound function will be described by reference to FIG. 6.

On the display screen of the LCD 25, the user gives an instruction to start the execution of, for example, the WAVE-type sound function (step A1).

According to the instruction from the user, the application program 32 requests the operating system to start the execution of the WAVE-type sound function (step A2).

In response to the request of the application program 32, the operating system 31 issues to the power-saving driver 34 an open message to start the execution of the WAVE-type sound function (step A3).

While the way of dealing with the WAVE-type sound function has been explained, the same is true for the MIDI-type sound function.

Figure 7:
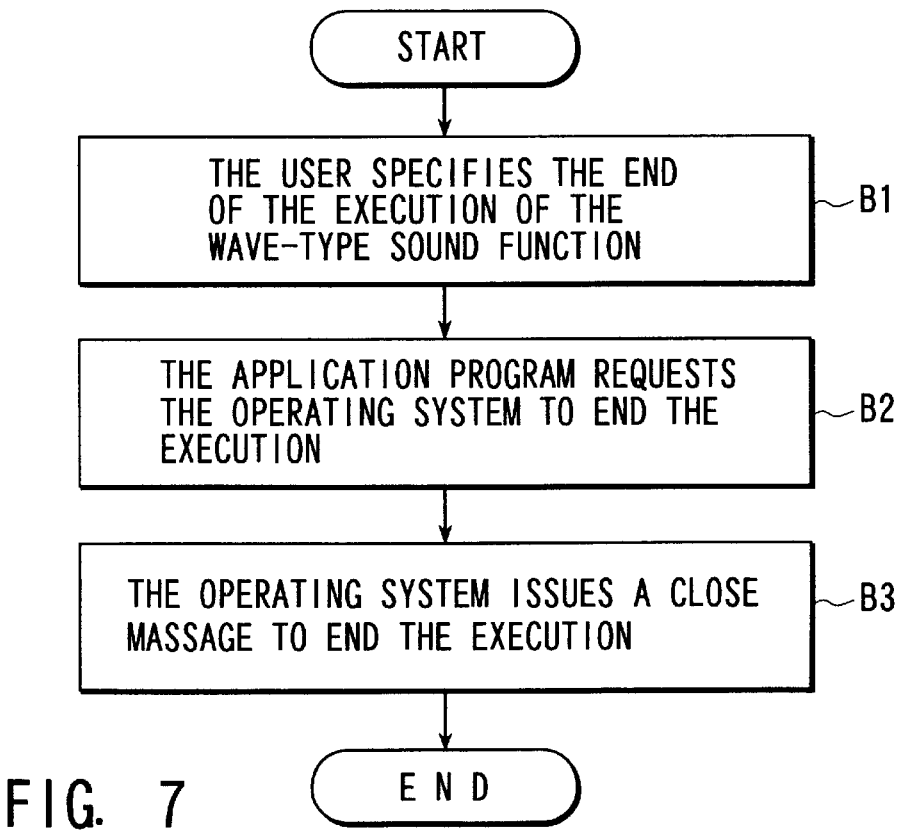
FIG. 7 is a flowchart of the procedure for issuing a close message according to an instruction to end the execution of the sound function.

Next, the procedure for issuing a close message according to an instruction to end the execution of the sound function will be described by reference to FIG. 7.

On the display screen of the LCD 25, the user gives an instruction to end the execution of, for example, the WAVE-type sound function (step B1).

According to the instruction from the user, the application program 32 requests the operating system to end the execution of the WAVE-type sound function (step B2).

In response to the request of the application program 32, the operating system 31 issues to the power-saving driver 34 a close message to end the execution of the WAVE-type sound function (step B3).

While the way of dealing with the WAVE-type sound function has been explained, the same is true for the MIDI-type sound function.

Figure 8:
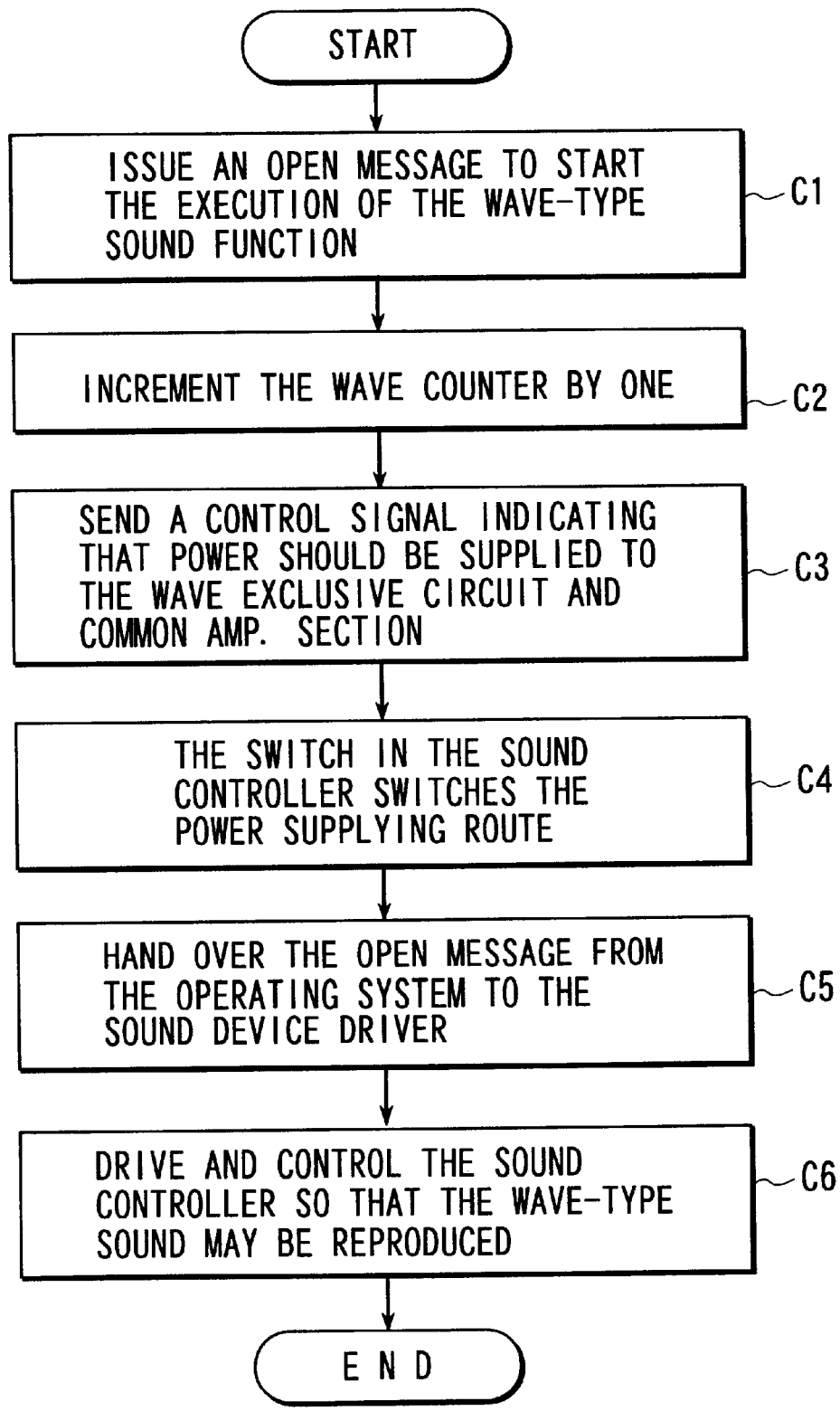
FIG. 8 is a flowchart of the procedure for controlling the power supply according to the issue of an open message.

Next, the procedure for controlling the power supply according to the issue of an open message will be explained by reference to FIG. 8.

The operating system 31 issues to the power-saving driver 34 an open message to start the execution of the WAVE-type sound function (step C1).

According to the open message to start the execution of the WAVE-type sound function, the power-saving driver 34 increments the WAVE counter 351 by one (step C2).

Then, the power-saving driver 34 sends to the sound controller 18 a control signal indicating that electric power should be supplied to the WAVE exclusive circuit 182 and common amplifier section 181 (step C3).

Receiving the control signal, the switch 184 in the sound controller 18 switches the power supplying route so that the power from the PSC 27 may be supplied to the WAVE exclusive circuit 182 and common amplifier section 181 (step C4).

Then, the power-saving driver 34 hands over to the sound device driver 33 the open message to start the execution of the WAVE-type sound function received from the operating system 31 (step C5).

Receiving the message, the sound device driver 33 drives and controls the sound controller 18 to reproduce the WAVE-type sound (step C6).

With the series of processes described above, after electric power has been supplied to the WAVE exclusive circuit 182 and common amplifier section 181 that are needed to execute the WAVE-type sound function, the sound controller 18 is controlled so as to reproduce WAVE-type sound. This reproduces the WAVE-type sound.

While the way of dealing with the WAVE-type sound function has been explained, the same is true for the MIDI-type sound function.

Figure 9:
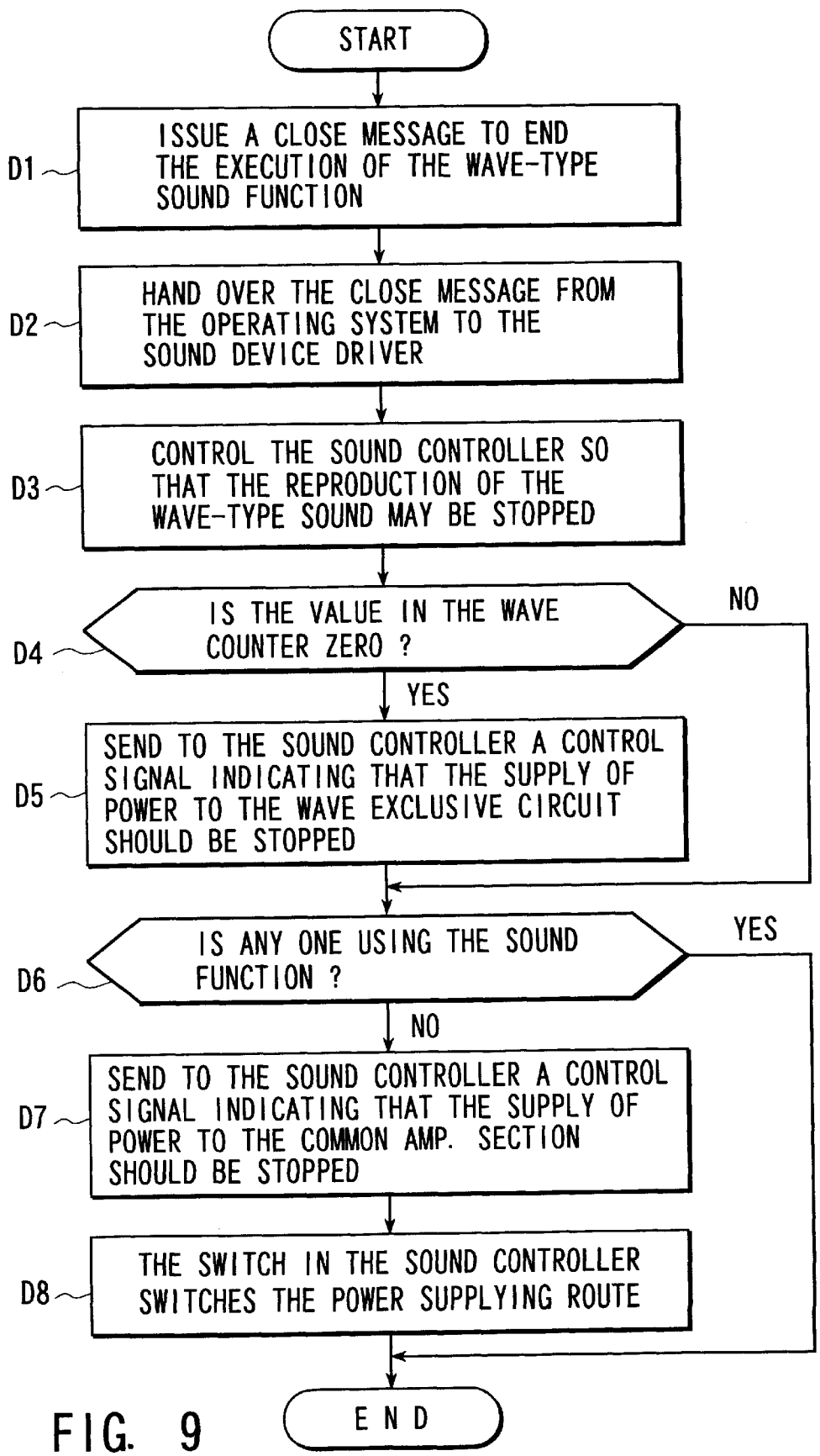
FIG. 9 is a flowchart of the procedure for controlling the power supply according to the issue of a close message.

Next, the procedure for controlling the power supply according to the issue of a close message will be explained by reference to FIG. 9.

The operating system 31 issues to the power-saving driver 34a close message to end the execution of the WAVE-type sound function (step D1).

The power-saving driver 34 hands over to the sound device driver 33 the close message to end the execution of the WAVE-type sound function received from the operating system 31 (step D2).

Receiving the message, the sound device driver 33 controls the sound controller 18 to stop the reproduction of the WAVE-type sound (step D3).

Next, the power-saving driver 34 decrements the WAVE counter 351 by one (step D3).

Then, the power-saving driver 34 judges whether or not the value in the WAVE counter 351 has reached zero (step D4).

If the value in the WAVE counter 351 is zero, this means that the WAVE-type sound function is out of operation. In this case, the power-saving driver 34 sends to the sound controller 18 a control signal indicating that the supply of power to the WAVE exclusive circuit 182 should be stopped (step D5). If the value in the WAVE counter 351 is not zero, the control signal will not be sent.

Next, referring to the other counters (in the embodiment, the MIDI counter 353), the power-saving driver 34 judges whether or not any other sound function (e.g., the MIDI-type sound function) is presently being used (step D6).

If no other sound function is not being used, the power-saving driver 34 sends to the sound controller 18 a control signal indicating that the supply of power to the common amplifier section 18 should be stopped (step D7). If any other sound is being used, the control signal will not be sent because electric power must be supplied to the common amplifier section 181.

Receiving the control signal, the switch 184 in the sound controller 18 switches the power supply route so that the supply of power from the PSC 27 to the WAVE exclusive circuit 182 and common amplifier section 181 may be stopped (step D8).

With the series of processes described above, after the sound controller 18 has been controlled so that the reproduction of the WAVE-type sound may be stopped, which has stopped the reproduction of the WAVE-type sound, the unnecessary supply of power to the WAVE exclusive circuit 182 (and the common amplifier section 181) at the end of the execution of the WAVE-type sound function is stopped.

As described above, with the personal computer of the embodiment, even if the sound device driver 33 has no power-saving function, the electric power unnecessarily consumed by the sound controller 18 can be reduced remarkably by operating the power-saving driver 34.

When the sound driver 33 can be modified, it is easy to produce a similar power-saving effect by providing the sound device driver 33 with the function of the power-saving driver 34.

Figure 10:
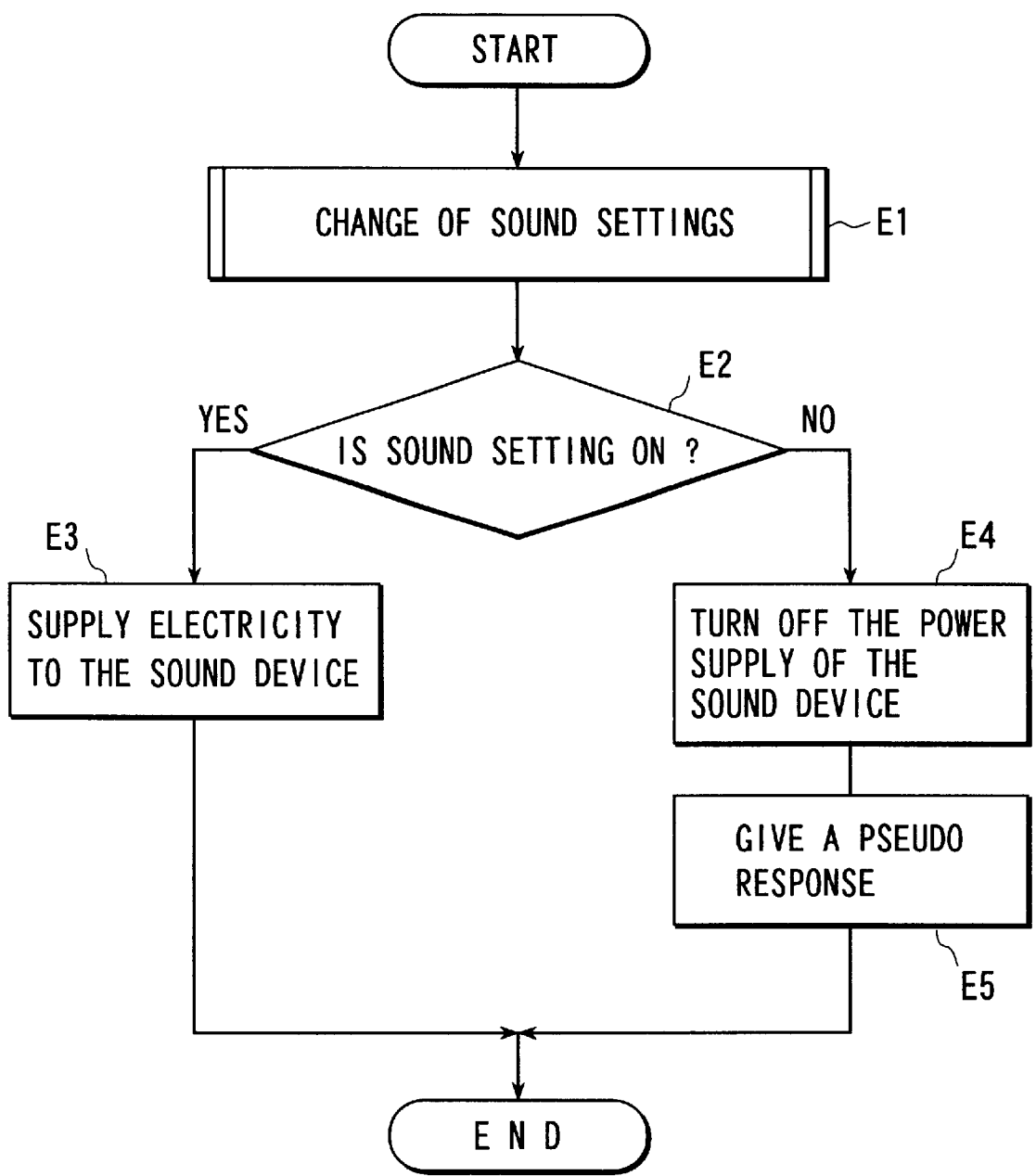
FIG. 10 is a flowchart of the procedure for reducing the power consumption more effectively.

Next, a case where the power-saving driver 34 reduces the power consumption more effectively by providing the operating system 31 with pseudo response means will be explained by reference to FIG. 10.

First, on a pop-up screen provided by a utility program running on the operating system 31, whether or not sound is used is set (step E1).

Then, it is judged whether use of sound is valid [ON] invalid [OFF] (step E2).

When sound is set to valid (Y in step E2), the power-saving driver 34 sends a control signal for turning on the power supply of the sound controller 18 (step E3).

When sound is set to invalid (N in step E2), the power-saving driver 34 sends a control signal for turning off the power supply of the sound controller 18 (step E4).

Furthermore, when sound is set to invalid, the power-saving driver 34 returns a pseudo response representing a normal end for all of the messages that the operating system 31 issues to the sound device driver 33 (step E5).

This makes it possible to execute an application program using the sound function, with the power supply of the sound controller 18 being off. This gives flexibility to the operation when the remaining amount of electricity in the battery is small.

As described earlier, when the sound driver 33 can be modified, it is easy to produce a similar power-saving effect by providing the sound device driver 33 with the function of the power-saving driver 34.

The method of controlling the power supply of the sound controller (the sound device) described in the embodiment can be stored in recording mediums, including magnetic disks (e.g., floppy disks or hard disks), optical disks (e.g., CD-ROMs or DVDs), or semiconductor memory, in the form of program code instructions that can be executed by the processor in the computer. Those recording mediums may be distributed.

As described above in detail, with the present invention, even when a sound device driver with no power-saving function is used, the sound device can be prevented from 5 unnecessarily consuming the power. The unnecessary power consumption results from continuing the supply of power, even when the sound function is not used. Furthermore, an application program using the sound function is allowed to operate properly, with the power supply of the sound device being off. This gives flexibility to the operation when the remaining amount of electricity is small.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a sound device, which provides a plurality of sound functions each differing in type, and which is capable of independently controlling the power to each of a plurality of portions corresponding to the plurality of sound functions;

a sound controller for controlling the sound device;

means for detecting a message issued to the sound controller;

means for setting a sound function to valid or invalid;

means for, when the sound function is set to valid, turning on a power supply of the sound device and; and means for, when the sound function is set to invalid, turning off the power supply of the sound device and returning a pseudo response representing a normal end for the message issued to the sound controller.

2. The system according to claim 1, wherein the message is issued to the sound device from an operating system and the pseudo response means returns the pseudo response to the operating system.

3. A power control method for use in a computer system having a sound device providing a plurality of sound functions each differing in type, and being capable of independently controlling the power to each of a plurality of portions corresponding to the plurality of sound functions, the method comprising:

detecting a message issued to a sound controller;

setting a sound function to valid or invalid;

when the sound function is set to valid, turning on a power supply of the sound device; and when the sound function is set to invalid, turning off the power supply of the sound function and returning a psuedo response representing a normal end for the message issued to the sound controller.

4. The method according to claim 3, wherein said returning comprises: returning the pseudo response to an operating system that issued the message.

* * * * *